May 4, 1937. W. A. RIKE 2,079,264
BREAD DUMMY
Filed March 19, 1936
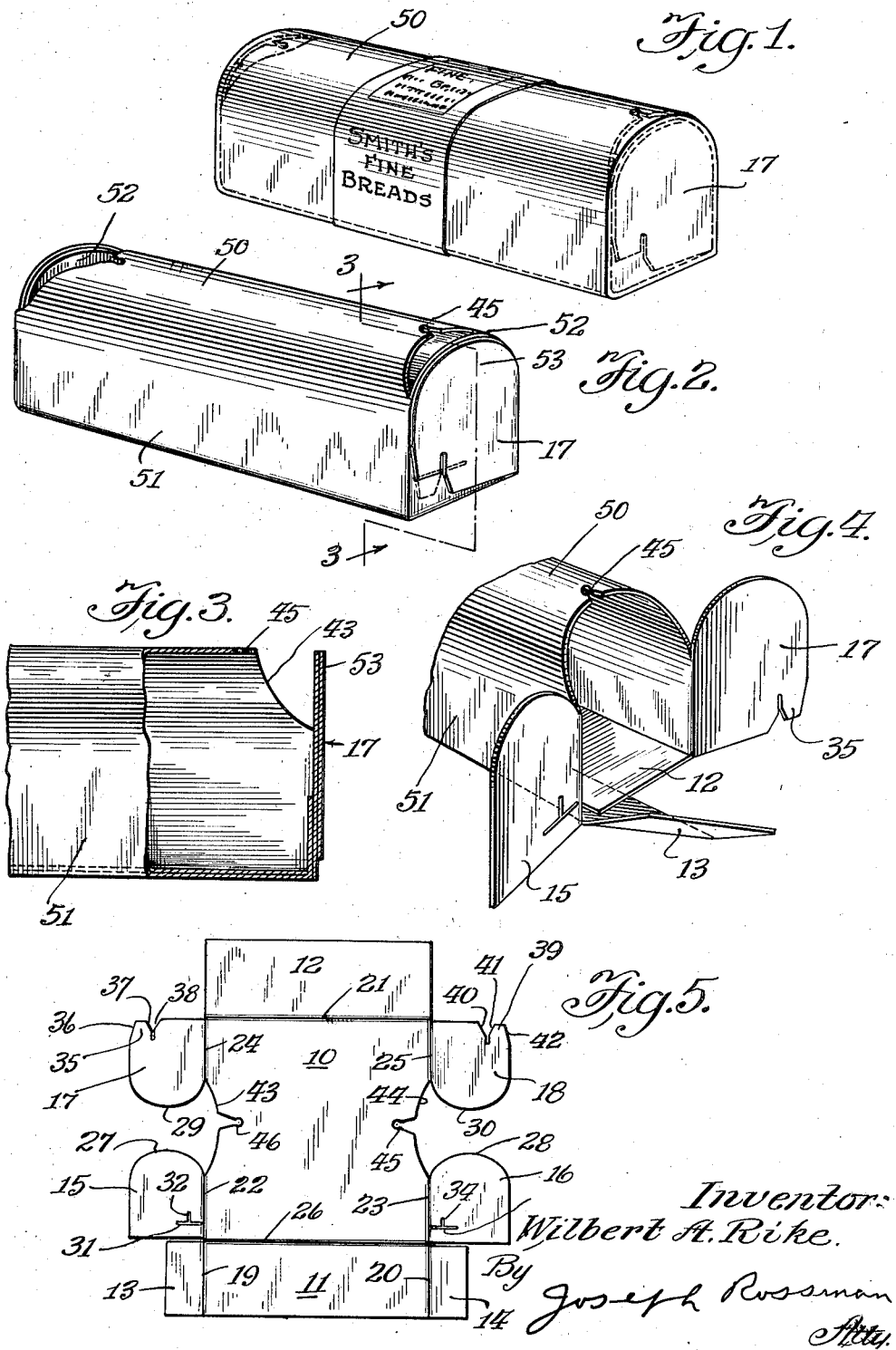
Inventor:
Wilbert A. Rike.
By Joseph Rossman
Atty.

Patented May 4, 1937

2,079,264

UNITED STATES PATENT OFFICE 2,079,264

BREAD DUMMY

Wilbert A. Rike, Neenah, Wis., assignor to Marathon Paper Mills Company, Rothschild, Wis., a corporation of Wisconsin Application March 19, 1936, Serial No. 69,713

5 Claims. (Cl. 40—126)

This invention relates to a bread dummy and an object of this invention is to provide a blank which can be folded so as to assume the shape of a loaf of bread.

Another object of this invention is to provide a single cut out blank which can be folded to represent a loaf of bread.

Further and other objects of this invention will be apparent from the annexed drawing and the following specification.

On the drawing:

Figure 1 is a representation of the bread dummy wrapped with a bread wrapper.

Figure 2 is a perspective view of the dummy without the bread wrapper.

Figure 3 is a fragmentary view partly in section on lines 3—3 of Figure 2.

Figure 4 is a fragmentary perspective view of the bread dummy prior to assembly of the end flaps.

Figure 5 is a plan view of the cut out blank.

Manufacturers of bread wrappers often find it necessary to study a proposed bread wrapper design by wrapping the same around a loaf of bread in order that they may definitely decide whether such proposed wrapper is satisfactory. It has been found very inconvenient to use an actual loaf of bread for such tests because the bread soon becomes hard and moldy. Furthermore manufacturers of bread wrappers usually submit their proposed designs to customers who are located at a considerable distance and it is very cumbersome to send to them a loaf of bread wrapped with a proposed wrapper in order that they may obtain an idea of the proposed bread wrapper in actual use.

Furthermore the use of a dummy made from wood or similar materials having the same configuration as a loaf of bread is not very satisfactory because of the unyielding character of such materials.

In order to obviate these aforementioned inconveniences I have devised a bread dummy which is made from a single cut-out blank. When such blank is shaped into form I have found it to be a very satisfactory substitute for a loaf of bread for the purposes of testing a proposed bread wrapper. Such dummy is very light in weight, inexpensive, does not deteriorate with age and can be readily shipped either in flat or in set up condition. By using carton stock or similar material the bread dummy will have the same yielding characteristics as an actual loaf of bread so that it is possible to wrap a proposed bread wrapper about same and thereby reproduce actual conditions under which the proposed bread wrapper will be used.

As shown in Figure 1 the blank consists of a large body portion 10 which is scored along lines 21 and 26 to form bottom panels 11 and 12. The bottom panel 11 is scored along lines 19 and 20 to form tabs or end flaps 13 and 14 respectively. Panel 12 is not provided with any end flaps.

The body panel 10 is provided at each corner thereof with end panel portions 15, 16, 17 and 18, folded along lines 22, 23, 24 and 25 respectively. Each of these panel portions is provided with a semi-circular curved portion 27, 28, 29 and 30 respectively which are symmetrically arranged so as to oppose each other.

Panel 15 is provided with a slit 31 adjacent and perpendicular to the score line 22. A short perpendicular slit 32 intersects slit 31. Flap 16 is similarly provided with a slit 33 and a short slit 34 perpendicular thereto.

Panel 17 is cut along lines 36, 37 and 38 to provide a locking tab 35. Panel 18 is similarly cut along lines 40, 41 and 42 to provide a locking tab 39.

Panel 10 is cut out in an arc or curvilinear form along lines 43 and 44 intermediate the panels 15 and 17, and 16 and 18 respectively. The mid points of arcs 43 and 44 are joined by cut-out portions 45 and 46 respectively extending a short distance in body panel 10.

In setting up the carton to assume the contour of a loaf of bread, panel 10 is bent into curved form as shown in Figure 2 and the bottom panels 11 and 12 are brought into overlapped relation. Flaps 13 and 14 are then folded up. Panel 15 is then folded over flap 13 and then panel 17 is folded thereover. Locking tongue 35 is then inserted into slit 32 facilitating the easy insertion thereof.

Panel 16 is similarly folded over panel 14 and panel 18 is then folded thereover and locked into position by inserting tongue 39 into slit 33, the insertion thereof being facilitated by slit 34.

A bread dummy is thus produced as shown in Figure 2. It will be noted that this dummy comprises a convexly shaped dome portion 50 merging into flat vertical wall portions 51.

As shown in Figure 2 an open space 52 is provided at each upper end of the dummy. When a bread wrapper is wrapped tightly about the dummy it will draw inwardly the upper curved portions 53 of the end panels so as to close up the space 52.

Since the carton is slightly yieldable as a result of this structure the same yielding structure will be reproduced as in an actual loaf of bread. Similarly the lateral tension of the bread wrapper will produce a slight compression on the dome portion as well as the flat lateral portion of the dummy and these will yield to a slight extent as in the case of an actual loaf of bread. Slits 45 and 46 will also serve to enhance the yieldability of the dome portion when compressed by the bread wrapper.

The bread dummy herein described thus serves admirably as a substitute for an actual loaf of bread. The bread dummy can be used for testing out proposed bread wrapper designs as well as for making displays in windows and stores instead of using actual wrapped loaves of bread which dry quickly, shrink and mold.

If desired the bread dummy may be used as a carton for containing a loaf of bread having the same shape. In such case it may be desirable not to cut the panel 10 along the curvilinear lines 43 and 44 as shown in Figure 5 but merely to have the cut edge of the panel 10 abut the end panels so as to form a completely closed carton and thereby protect the bread therein from dirt, dust and loss of moisture.

It is obvious that many changes and modifications may be made in the carton structure without departing from the spirit of the invention herein disclosed and it is intended to include all such modifications in the appended claims.

I claim:

1. An article of the character described consisting of a single cut-out blank forming a body portion having a convexly shaped dome portion, flat vertical wall portions, and end walls, said dome portion being cut inwardly at each end thereof to provide open spaces to permit inward flexing of the upper portions of said end walls.

2. An article of the character described consisting of a single cut-out blank forming a body portion having a convexly shaped dome portion, flat vertical wall portions, and end walls, said dome portion being slit longitudinally to increase its flexibility.

3. A carton blank for forming a bread dummy consisting of a large body portion foldable into bread-like contour, a flap at each side thereof foldable into overlapping relation to form the bottom of said bread dummy, and suitably shaped end panels foldably attached at each corner of said body portion to form end panels for said bread-dummy.

4. A carton blank for forming a bread dummy consisting of a large body portion foldable into bread-like contour, a flap at each side thereof foldable into overlapping relation to form the bottom of said body portion, and suitably shaped end panels foldably attached at each corner of said bread-dummy, said end panels being provided with tongues and slots to lock into overlapping relation.

5. A carton having the shape of a loaf of bread consisting of a single blank having a dome-shaped portion, side walls, end walls and an imperforate bottom wall, said bottom wall having end flaps at the ends thereof and hingedly connected thereto, said end walls being adapted to be interlocked and folded over said end flaps.

WILBERT A. RIKE.

CERTIFICATE OF CORRECTION.

Patent No. 2,079,264. May 4, 1937.

WILBERT A. RIKE.

It is hereby certified that error appears in the printed specification of the above numbered patent requiring correction as follows: Page 2, second column, line 22, claim 4, for the words "body portion" read bread-dummy; and line 24, same claim, for "bread-dummy" read body portion; and that the said Letters Patent should be read with these corrections therein that the same may conform to the record of the case in the Patent Office.

Signed and sealed this 27th day of July, A. D. 1937.

Henry Van Arsdale (Seal) Acting Commissioner of Patents.